United States Patent Office 3,660,422
Patented May 2, 1972

---

3,660,422
1,4-PHENYLENE-BIS-DITHIOCARBAMIC ACID ESTERS
Manfred Schorr, Frankfurt am Main, Walter Durckheimer, Hattersheim (Main), and Dieter Duwel, Hofheim, Taunus, Germany, assignors to Farbwerke Hoechst Aktiengesellschaft vormals Meister Lucius & Bruning, Frankfurt am Main, Germany
No Drawing. Filed July 11, 1969, Ser. No. 841,111
Claims priority, application Germany, Aug. 3, 1968, P 17 95 057.1
Int. Cl. C07d *49/38*
U.S. Cl. 260—309.2     1 Claim

ABSTRACT OF THE DISCLOSURE

Anthelmintically-active bis-dithiocarbamic esters of the formula

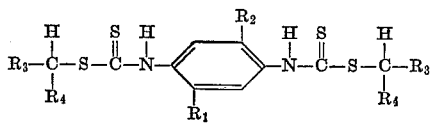

wherein $R_1$ and $R_2$ are hydrogen, halogen, alkyl having 1–6 carbon atoms, or alkoxy having 1–6 carbon atoms, $R_3$ is hydrogen or alkyl having 1–6 carbon atoms, and $R_4$ is 2-benzimidazole or 2-benzamidazole substituted with one or more halogen, lower alkyl, trifluoromethyl, lower alkoxy, nitro, sulfamido, or nitrilo groups. The esters, which are active against liver flukes for example, are prepared by reacting a salt of a corresponding bis-dithiocarbamic acid with a compound of the formula

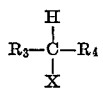

wherein X is chlorine, bromine, or iodine.

---

The present invention relates to bis-dithiocarbamic acid esters of the general formula

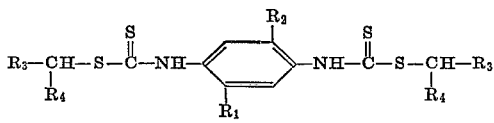

wherein $R_1$ and $R_2$, which may be identical or different, represent hydrogen, halogen, alkyl or alkoxy having 1–6 carbon atoms, $R_3$ represents hydrogen or alkyl having 1–6 carbon atoms, and $R_4$ represents a benzimidazole group which may be substituted once or several times by halogen, or lower alkyl, trifluoromethyl, lower alkoxy, nitro, sulfamido or nitrile groups.

Furthermore, the present invention provides a process for preparing the above-identified compounds of Formula I, wherein a water-soluble salt of p-phenylene-bis-dithiocarbamic acid of the formula

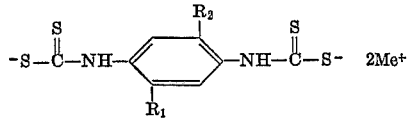

is reacted in known manner with a halogen-compound of the formula

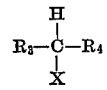

in which X represents chlorine, bromine or iodine.

As active halogen-compounds there may be used, for example,

2-α-chloroethyl-benzimidazole,
2-α-chloropropyl-benzimidazole,
2-α-chlorobutyl-benzimidazole,
2-α-chlorohexyl-benzimidazole,
1-ethyl-2-chloromethyl-benzimidazole,
1-ethyl-2-α-chloroethyl-benzimidazole,
1-butyl-2-α-chlorobutyl-benzimidazole,
5-ethyl-2-chloromethyl-benzimidazole,
5,6-dimethyl-2-chloromethyl-benzimidazole,
4,6-dibutyl-2-α-chloroethyl-benzimidazole,
5,6-dichloro-2-chloromethyl-benzimidazole,
5-methoxy-2-α-chloroethyl-benzimidazole,
5-nitro-6-chloro-2-chloromethyl-benzimidazole,
4-sulfonamido-5,6-dimethyl-2-chloromethyl-benzimidazole.

The p-phenylene-bis-dithiocarbamic acids, which may be substituted, are preferably used in the form of the water-soluble ammonium or alkali metal salts.

The starting substances of the Formula II are obtainable according to the method of G. J. M. Van der Kerk et al., Rec. 74, 1268 (1955). The reaction is preferably carried out by combining the salt of the p-phenylene-bis-dithiocarbamic acid, dissolved in water, with a compound of the Formula III, dissolved in a solvent that is miscible with water, for example acetone, alcohol, tetrahydrofurane, dioxane, acetonitrile, or dimethylformamide, isolating the reaction product that separates after a short period of time and purifying it by washing or by solution and reprecipitation from suitable solvents. According to another method of operation, it is also possible to prepare the salt of p-phenylene-diamine-bis-dithiocarbamic acid in situ by the reaction of p-phenylene-diamine, carbon disulfide and alkali and then to react it further. The reaction temperature is in the range of from 0 to 50° C.; preferably, however, the reaction is carried out at room temperature.

The novel esters of the p-phenylene-bis-dithiocarbamic acids of the present invention are chemotherapeutically active and are suitable for the treatment of worm diseases. This anthelmintic action is especially marked against the cat liver fluke. While effective agents against the great live fluke (*Fasciola hepatica*) and the lancet fluke (*Dicrocoelium dendriticum*) are available, no chemotherapeutic agent is known as yet that has a specific action against the Opisthorchis species occurring in man and animals (*Opisthorchis felineus, Opisthorchis viverini* and *Opisthorchis sinensis*). In many Asian countries, the infestation of man and domestic animals by liver flukes is of considerable importance.

The chemotherapeutic tests were cairred out on golden hamsters, which had been infected for test purposes with Opisthorchis felineus; the compounds to be tested were administered three to five times to the animals on consecutive days. The result of the treatment was tested by examination of the faeces for excretion of eggs and by dissection of the animals.

The following Table I shows a selection of the therapeutic results.

TABLE I

| Preparation | Dos. tol., max./kg. of mouse, peroral | Dosis curative minima in mg./kg. of body weight |
|---|---|---|
| 1,4-phenylene-bis-dithiocarbamic acid-benzimidazolyl(2)-methyl ester. | 1,250 | 3 x 100 |
| 1,4-phenylene-bis-dithiocarbamic acid-[-1-methylbenzimidazolyl(2)-methyl ester. | 5,000 | 3 x 400 |
| 1,4-phenylene-bis-dithiocarbamic acid-[4-sulfonamido-benzimidazolyl(2)]-methyl ester. | >3,200 | 3 x 100 |
| 1,4-phenylene-bis-dithiocarbamic acid-[5-chlorobenzimidazolyl(2)]-methyl ester. | 3,200 | 3 x 200 |
| 1,4-phenylene-bis-dithiocarbamic acid-[5-methylbenzimidazolyl(2)]-methyl ester. | 800 | 3 x 100 |

3

The compounds obtained according to the present invention are preferably used for the manufacture of orally administrable medicinal preparations for the treatment of worm infections.

As such medicinal preparations, there enter into consideration, for example, capsules, dragées, tablets, etc., which may contain, in addition to the products of the present invention as the active substance, the usual adjuvants and auxiliary agents. It is also possible to combine the products of the invention with other chemotherapeutic agents. The dose of active substance is to be adapted to the compound used as the active substance and to the desired effect.

The following examples illustrate the invention but they are not intended to limit it thereto:

EXAMPLE 1

(a) 1,4-phenylene-bis-dithiocarbamic acid-benzimidazolyl-(2)-methyl ester 29.4 g. of the ammonium salt of 1,4-phenylene-bis-dithiocarbamic acid were dissolved in 1.5 liter of water, small amounts of impurities were filtered off and a solution of 33 g. of 2-chloromethyl-benzimidazole in 500 ml. of acetone was added, while stirring. The reaction product that had precipitated rapidly was filtered off with suction after about 30 minutes, washed thoroughly with water and acetone and dried over sulfuric acid under reduced pressure. 33 g. of (64% of the theory) of 1,4-phenylene-bis-dithiocarbamic acid-benzimidazolyl-(2)-methyl ester melting at 130–133° C. (decomposition) were obtained.

*Analysis.*—Calcd for $C_{24}H_{20}N_6S_4$ (percent): (518.7): C, 55.36; H, 3.87; N, 16.14; S, 24.63. Found (percent): C, 55.0; H, 4.3; N, 16.2; S, 24.5.

In analogous manner, there were obtained:

(b) 1,4-phenylene-bis-dithiocarbamic acid-[1-methyl-benzimidazolyl(2)]methyl ester, melting point from 160° C. (decomposition) upwards (c) 1,4-phenylene-bis-dithiocarbamic acid-[5-nitrobenzimidazolyl(2)]-methyl ester, melting point 188–190° C. (decomposition)

(d) 1,4-phenylene-bis-dithiocarbamic acid-[5-chlorobenzimidazolyl(2)]-methyl ester, melting point 125–128° C. (decomposition)

(e) 1,4 - phenylene - bis-dithiocarbamic acid-[5-methyl-benzimidazolyl(2)]-methyl ester, melting point 135–140° C. (decomposition)

(f) 1,4 - phenylene - bis-dithiocarbamic acid-[5-trifluoromethylbenzimidazolyl(2)]-methyl ester, melting point 138–140° C. (decomposition)

(g) 1,4-phenylene-bis-dithiocarbamic acid-α-[1-methyl-benzimidzolyl(2)]-ethyl ester, melting point 105–110° C. (decomposition)

(h) 1,4-phenylene-bis-dithiocarbamic acid-[5-cyanobenzimidazolyl(2)]-methyl ester, melting point 178–180° C. (decomposition)

EXAMPLE 2

1,4-phenylene-bis-dithiocarbamic acid-[4-sulfoamido-benzimidazolyl(2)]-methyl ester 2.9 g. of the ammonium salt of 1,4-phenylene-bis-dithiocarbamic acid were dissolved in 150 ml. of water, filtered and combined, while shaking, with a solution of 4.9 g. of 4-sulfonamido-2-chloromethyl-benzimidazole in 30 ml. of dimethylformamide. The reaction product separated after a few minutes and, after cooling of the solution to 0° C., was filtered off with suction and washed thoroughly with water. For purification, the crude product was treated with acetone, filtered off with suction and dried over sulfuric acid under reduced pressure. 5.6 g. (83% of the theory) of 1,4-phenylene-bis-dithiocarbamic acid - [4 - sulfonamido-benzimidazolyl(2)]-methyl ester, melting at 182–183° C. with decomposition were obtained.

4

Calcd. for $C_{24}H_{22}N_8O_4S_6$ (percent) (678.9): C, 42.46; H, 3.27; N, 16.51. Found (percent): C, 42.2; H, 3.5; N, 16.5.

EXAMPLE 3

2,5-dimethyl-1,4-phenyl-bis-dithiocarbamic acid-[benzimidazolyl(2)]-methyl ester 32.2 g. of the ammonium salt of 2,5-dimethyl-1,4-phenyl-bis-dithiocarbamic acid were dissolved in 300 ml. of water and combined, at room temperature, while stirring, with a solution of 33.2 g. of 2-chloromethyl-benzimidazole in 300 ml. of methanol. After a few minutes, an oil separated which solidified after about 1 hour. It was filtered off with suction, disolved in 250–300 ml. of methanol, filtered and cooled. 15.6 g. (28% of the theory) of 2,5-dimethyl - 1,4 - phenylene-bis-dithiocarbamic acid-[benzimidazolyl(2)]-methyl ester, decomposing at 174° C., were obtained; the product was washed with acetone and ether and dried over concentrated sulfuric acid.

Calcd for $C_{26}H_{24}N_6S_4$ (percent) (548.8): C, 56.91; H, 4.40; N, 15.32. Found (percent): C, 57.6; H, 4.7; N, 15.6.

EXAMPLE 4

2,5-dimethoxy-1,4-phenylene-bis-dithiocarbamic acid-[benzimidazolyl(2)]-methyl ester 8 g. of sodium hydroxide in 100 ml. of water were added dropwise, at room temperature, while stirring, to 16.8 g. of 2,5-dimethoxy-1,4-diamino-benzene and 12 ml. of carbon disulfide in 100 ml. of acetonitrile. After 1 hour, the brownish solution was poured into 1 liter of water and the oily product that had separated was isolated by means of a clarifying layer. The filtrate was combined, while stirring, with a solution of 33.2 g. of 2-chloromethyl-benzimidazole in 300 ml. of methanol. An oily precipitate formed which solidified rapidly upon trituration. The crude product was filtered off with suction, washed with water and dissolved in an as small amount of acetone as possible. Upon standing and cooling, 7.8 g. (13.5% of the theory) of 2,5-dimethoxy-1,4-phenylene-bis-dithiocarbamic acid-benzimidazolyl-(2)-methyl ester separated which were washed with acetone and ether and dried over concentrated sulfuric acid. The decomposition point was at 154–155° C.

Calcd. for $C_{26}H_{24}N_6O_2S_4$ (percent) (580.8): C, 53.77; H, 4.17; N, 14.47. Found (percent): C, 53.7; H, 3.8; N, 15.0.

EXAMPLE 5

(a) 2-methyl-1,4-phenylene - bis - dithiocarbamic acid-[benzimidazolyl-(2)]-methyl ester A solution of 8 g. of sodium hydroxide in 100 ml. of water was added dropwise, within 1 hour, while stirring, to a mixture of 12.2 g. of 2-methyl-1,4-diaminobenzene and 12 ml. of carbon disulfide in 100 ml. of water. A small quantity of resinous products was separated and the clear filtrate was combined, while stirring, with a solution of 33.2 g. of 2-chloromethyl-benzimidazole in 300 ml. of methanol. The oil that had separated was well washed with water and then treated with about 300 ml. of acetone. 6.3 g. (12% of the theory) of 2-methyl-1,4-phenylene-bis - dithiocarbamic acid-[benzimidazolyl (2)]-methyl ester decomposing at 153° C. were obtained in the form of a yellowish powder.

In analogous manner, there were obtained:

(b) 2-chloro-1,4-phenylene - bis - dithiocarbamic acid-[benzimidazolyl(2)]-methyl ester, melting point 153–155° C. (decomposition).

We claim:
1. A bis-dithiocarbamic acid ester of the formula

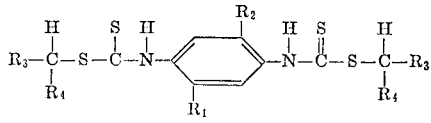

wherein $R_1$ and $R_2$ are the same or different and are hydrogen, halogen, alkyl having 1–6 carbon atoms, or alkoxy having 1–6 carbon atoms, $R_3$ is hydrogen or alkyl having 1–6 carbon atoms, and $R_4$ is 2-benzimidazole or 2-benzimidazole substituted with one or more halogen, lower alkyl, trifluoromethyl, lower alkoxy, nitro, sulfamido, or nitrilo groups.

References Cited

UNITED STATES PATENTS

| | | | |
|---|---|---|---|
| 1,915,334 | 6/1933 | Salzberg et al. | 260—243 |
| 2,075,359 | 3/1937 | Salzberg et al. | 424—250 |

OTHER REFERENCES

Chemical Abstracts, vol. 69: 96198 u, Yokoi et al. (1968).

HENRY R. JILES, Primary Examiner

S. D. WINTERS, Assistant Examiner

U.S. Cl. X.R.

260—513.5; 424—273